United States Patent [19]

Tucker et al.

[11] Patent Number: 5,169,877
[45] Date of Patent: * Dec. 8, 1992

[54] RIGID POLYURETHANE FOAMS WITH LOW THERMAL CONDUCTIVITIES

[75] Inventors: Benjamin W. Tucker, Bethany, Conn.; Debkumar Bhattacharjee, Lake Jackson, Tex.

[73] Assignee: The Dow Chemical Company, Midland, Mich.

[*] Notice: The portion of the term of this patent subsequent to Apr. 16, 2008 has been disclaimed.

[21] Appl. No.: 638,858

[22] Filed: Jan. 8, 1991

Related U.S. Application Data

[63] Continuation-in-part of Ser. No. 482,380, Feb. 20, 1990, Pat. No. 5,008,299, which is a continuation-in-part of Ser. No. 282,369, Dec. 9, 1988, abandoned.

[51] Int. Cl.$^5$ ............................................. C08G 18/14
[52] U.S. Cl. ..................................... 521/159; 521/173
[58] Field of Search .................................. 521/159, 173

[56] References Cited

U.S. PATENT DOCUMENTS 4,576,974  3/1986  Carroll et al. ........................ 521/173
5,008,299  4/1991  Tucker et al. ........................ 521/173

*Primary Examiner*—Maurice J. Welsh

[57] ABSTRACT

Disclosed are rigid cellular polyurethanes prepared by bringing together under foam forming conditions an aromatic polyisocyanate and a polyhydric combination comprising a major proportion of a crude polyester polyol and minor proportion of a cross-linking polyol. This selection of particular ingredients gives rise to foams having extremely low initial insulation K factor values.

6 Claims, No Drawings

RIGID POLYURETHANE FOAMS WITH LOW THERMAL CONDUCTIVITIES

CROSS REFERENCE TO RELATED APPLICATION

This application is a continuation-in-part of the co-pending application Ser. No. 482,380, filed Feb. 20, 1990, now U.S. Pat. No. 5,008,299, which is a continuation-in-part of application Ser. No. 282,369, filed Dec. 9, 1988, now abandoned.

FIELD OF THE INVENTION

This invention relates to the preparation of polymer foams and is more particularly concerned with rigid polyurethane foams.

DESCRIPTION OF THE PRIOR ART

Polyurethane foams derived from the reaction of polyisocyanates with both polyether based polyols and polyester based polyols and mixtures thereof in the presence of blowing agents are well known items of commerce. Until recently polyether polyols have been by far the most widely used class of polyol resins in the manufacture of rigid cellular polyurethanes. Primarily, this is due to their low cost and ready availability. For typical polyether polyols and their commercial sources see Plastic Foams Part II pp. 459 to 461 (1973)

Generally speaking these newer classes of polyester polyols have been employed as so-called extender polyols in combination with polyether polyols in order to achieve a proper viscosity mix and fluorocarbon blowing agent solubility in the polyol B side. Also, they have found application in polyisocyanate prepolymer formulations. Typical U.S. patents disclosing such polyester polyols and their application in polyurethanes are U.S. Pat. Nos. 4,048,104; 4,223,068; 4,400,477; 4,417,001; 4,439,549; 4,439,550; 4,442,237; 4,444,918; 4,444,919; 4,465,793; 4,469,821; 4,469,824; 4,485,196; 4,506,090; 4,521,611; 4,539,341; 4,544,679; 4,559,370; 4,604,410; 4,642,319; 4,644,019; 4,701,477; and 4,722,803.

Of the numerous references cited supra few, if any, disclose the formation of rigid polyurethane cellular materials having exceptional insulation properties as evidenced by very low K factors. K factor is the well-known measure of the insulation property of a cellular material as typically determined in the units BTU-in/hr. ft$^2$ °F. in accordance with ASTM Test Method C-518. Only U.S. Pat. Nos. 4,539,341 and 4,642,319 disclose initial K factors below 0.11. The former reference discloses polyisocyanurate foams having an initial K factor of 0.107, whereas the polyurethane foams have initial values of 0.14. The polyisocyanurate foam was prepared from a polymethylene poly(phenyl isocyanate) and the subject polyester polyol obtained from polyethylene terephthalate scrap via digestion with a glycol and a polycarboxylic acid derivative, e.g. phthalic anhydride. The reference teaches the option of using 95 to 0 weight percent of other polyols which broadly embrace the total range of known organic polyols. In respect of the polyurethane foams, the reference specifically exemplifies blends of the scrap polyester polyol with a sucrose/amine polyol in a 30/70 weight blend. The broad teaching is directed to a 5 to 100 percent scrap polyol content but preferably 20 to 50 percent wherein the complementary polyol is drawn from the same broad total range of polyols referred to above.

U.S. Pat. No. 4,642,319 discloses both polyurethane and polyisocyanurate foams. In this case, the scrap polyester polyol is itself first reacted with a so-called functionality enhancing agent. Then this polyol product is reacted singly or in combination with (e.g. 0 to 95 weight percent) other polyols with the polyisocyanate. The K factor values for the majority of both the polyurethane and polyisocyanurate foams are greater than 0.11. Only a few examples were observed to be significantly below 0.11.

U.S. Pat. No. 4,417,001 discloses polyisocyanurate foams made from the polyisocyanate and a polyol including 5 to 100 percent of a digestion product from polyalkylene terephthalate residues and 0 to 95 percent of a "conventional" polyol. Amongst the conventional polyols there are disclosed polyols which could be classified as cross-linkers. However, the initial K factors disclosed are not particularly low (i.e. 0.125).

U.S. Pat. No. 4,469,821 also discloses polyisocyanurate foams wherein a preponderance of a crude polyester polyol is used with a minor component of a particular polyether polyol of average functionality at least 4.

Those foams are strictly polyisocyanurate materials and no particular K factor data is disclosed.

U.S. Pat. No. 4,604,410 discloses the preparation of rigid polyurethane or polyisocyanurate foams wherein the polyol component is an etherified aromatic polyester polyol derived by digestion of a scrap PET. The scrap polyol may be used alone or in combination with up to 80 parts of a polyoxypropylene polyol. However, no specific polyol blends are shown in the working examples and the initial K factors measured all exceed 0.11.

In a series of U.S. patents of the same assignee, mixtures of variously derived crude polyester polyols are disclosed either for use alone in preparing polyisocyanurate foams or as extenders with polyether polyols for the preparation of polyurethane foams. This series of patents includes U.S. Pat. Nos. 4,439,549; 4,439,550; 4,442,237; 4,444,918; 4,444,919; 4,469,824; 4,485,196; 4,506,090; and 4,644,019. Generally speaking, in the case of polyurethanes the polyester component is not used in proportions much above 30 weight percent. Although, in the broad teaching the polyether polyol component is shown to be 0 to 95 percent with the crude polyester polyol being 100 to 5 percent. The teaching directed to the polyether polyol component includes conventional polyols. Furthermore, none of the working examples in this series of disclosures shows an initial K factor below 0.11.

There still remains a need for polyurethane foams which can be prepared from readily available polyisocyanates and polyol components and which foams possess insulation factors consistently superior to those in the known art. The implication of having such materials is not only the increase in their insulative capacity, but also the reduction this leads to in the fluorocarbon blowing agent required. None of the references or teachings referred to above appears to provide polyurethane foams consistently having initial K factors much below 0.11.

SUMMARY OF THE INVENTION

The present invention is directed to improved rigid cellular polyurethanes prepared by bringing together under foam forming conditions an aromatic polyisocyanate and a polyhydric combination comprising (a) a polyester polyol and (b) from about 5 to about 80 percent by weight based on the combined weight of (a) and (b) of a crosslinking aliphatic polyether polyol, wherein the polyurethane has an initial insulation K factor of consistently about 0.004 BTU-in/hr ft$^2$ °F. less than that of a foam prepared in the same manner, except that component (b) is replaced with an equivalent amount of a crosslinking polyol other than component (b).

The rigid cellular polyurethanes of this invention thereby meet the need set forth above for the facile preparation of rigid polyurethane foams having improved thermal insulation properties over the known art.

The instant foams are characterized by having particularly low K factor values, relative to conventional foams made using an equivalent amount of a crosslinking polyol other than component (b). It is well recognized that the absolute magnitude of the K factor depends on various factors, only one of which is the choice of polyol components. These factors include the foam density, cell size, choice of blowing agent, choice of surfactant, physical configuration of the foam and others. Nonetheless, with this invention, an improvement in K factor of consistently at least 0.004, preferably at least about 0.005 BTU-in/hr ft$^2$ °F. is seen, relative to a like foam which differs only in the selection of crosslinking polyol. With foam prepared using CFC-11 as the blowing agent, the K factor preferably is in the range from about 0.093 to about 0.100. Foam made with different blowing agents will have K factors which are higher or lower, in accordance with differences between the K factors of the particular blowing agents and that of CFC-11. The use of the term "consistently" is used to take into account the normal variations in K factor which can be seen on individual testings, due to sample variations and imprecisions in the test method. Over an appropriate range of testings, an improved k factor is seen with this invention, although individual samples may or may not reflect the improvement, due to the aforementioned variabilities.

Notwithstanding the large body of art directed to polyol combinations of polyester polyols with conventional polyols discussed above, the prior art has not recognized nor provided polyurethane cellular materials characterized by such low initial K factors. Quite unexpectedly, the selection of particular cross-linking polyols and proportions from the prior art to be used in combination with various types of polyester polyols, gives rise to the present polyurethane foams having such surprisingly low initial K factors.

The rigid foams can be employed for all the purposes for which the currently produced cellular products are conventionally employed and are particularly suited for applications where thermal resistance is required. For example, the foams can be employed as insulation for tanks, pipes, refrigerator and freezer cabinets and the like.

DETAILED DESCRIPTION OF THE INVENTION

The rigid cellular polyurethanes in accordance with the present invention are readily prepared by bringing together the polyisocyanate and polyol combinations under foam forming conditions using any of the mixing methods well known in the art. For example, see Saunders and Frisch, Vols. I and II, *Polyurethanes Chemistry and Technology*, 1962, John Wiley and Sons, New York, N.Y.; more pertinently, see any of the U.S. patents cited supra regarding the use of polyester polyol, polyether polyol combinations for the preparation of polyurethane and polyisocyanurate foams. In particular, see U.S. Pat. Nos. 4,417,001; 4,439,549; 4,439,550; 4,442,237; 4,444,918; 4,444,919; 4,469,821; 4,469,824; 4,485,196; 4,506,090; 4,539,341; 4,604,410; 4,642,319; and 4,644,019 whose disclosures, relative to the preparation of polyurethane foams including the aromatic polyisocyanates, polyester polyols, foam forming ingredients such as blowing agents, catalysts and other adjuvants, are incorporated herein by reference. Accordingly, the polyurethane foams are readily prepared by bringing together the foam forming ingredients either by hand-mix methods for small preparations and, preferably, machine mixing techniques including high pressure impingement mixing to form buns, slabs, laminates, pour-in-place, spray-on-foams, froths, reaction injection molded bodies, and the like.

The novelty in the present invention resides in the selection of a particular class of cross-linking polyols and the selection of their proportions to be used in combination with the known polyester polyols. These selections result in polyurethane foams having initial K factor insulation values much lower than heretofore observed with known polyurethane or polyurethane-polyisocyanurate foams. That the selection invention is even more precise is noted from the fact that polyisocyanurate foams made with the identical ingredients, including their respective proportions to each other (except for excess polyisocyanate) do not have the same low K factors as their polyurethane counterparts (see examples below).

The term "cross-linking polyol" means an aliphatic polyether polyol or mixture of polyether polyols wherein the functionality has a value inclusive of an average value falling within the range of about 3.5 to about 8, preferably about 4 to about 6, most preferably about 4 to about 4.5, and a hydroxyl equivalent weight correspondingly falling within the range of about 70 to about 230, preferably about 80 to about 180, most preferably about 110 to about 130.

Particularly useful as a class of cross-linking polyols, are the polyether polyols resulting from the reaction of an aliphatic initiator compound or mixture of such initiators with an alkylene oxide or substituted alkylene oxide or mixtures thereof to provide the polyols having the broad and preferred functionalities and equivalent weights set forth above. Illustrative of the oxides which can be employed are ethylene oxide propylene oxide, butylene oxide, epichlorohydrin, epibromohydrin, and mixtures of any of the above.

Illustrative but non-limiting of the initiators are sucrose, glycerine, pentaerythritol, sorbitol, α-methyl glucoside, trimethylolpropane, ethylenediamine, diethylenetriamine, and the like, and mixtures of any of the above such that the average functionalities and equivalent weights fall within the above prescribed ranges. There can also be included in the polyol mixture difunctional components such as diethanolamine and glycols so long as the overall functionalities and equivalent weights fall within the prescribed ranges. A preferred cross-linking polyol for use in the present foams comprises a polyether polyol mixture having an average functionality from about 4 to about 6 and equivalent weight from about 80 to about 180 obtained from the reaction of ethylene oxide, propylene oxide, or mixtures of ethylene and propylene oxide with a combination of two or more of any of the above initiators and inclusive of difunctional components.

Generally speaking, polyether polyol comprises from about 5 to about 80 percent by weight of said polyhydric combination with the complementary portion of 95 to 20 percent being the polyester polyol. Preferably, the cross-linker is from about 10 to about 75, more preferably about 10 to about 50 percent by weight of the polyhydric mixture.

The polyester polyols employed in the polyhydric combination advantageously have average molecular weights and average functionalities falling within a range of from about 225 to about 5,000 and from about 2 to about 6, respectively. Preferably, the average molecular weight falls within a range of about 250 to about 1,500 with corresponding average functionalities of about 2 to about 4. A most preferred class of polyester polyol has an average molecular weight from about 250 to about 1,000 and average functionality from about 2 to about 3.

Suitable polyester polyols may be produced, for instance, from dicarboxylic acids, preferably aliphatic dicarboxylic acids having 2 to 12, preferably 4 to 8, carbon atoms in the alkylene radical and polyvalent alcohols, preferably diols. These acids include, for instance, aliphatic dicarboxylic acids such as succinic acids, glutaric acid, pimelic acid, undecanedioic acid, dodecanedioic acid, and preferably adipic acid, cyclic dicarboxylic acids, such as 1,3- and 1,4-cyclohexane dicarboxylic acid, and aromatic dicarboxylic acids such as phthalic acid and terephthalic acid. Examples of di- and multifunctional, particularly difunctional, alcohols are: propylene glycol, trimethylene glycol, dipropylene glycol, 1,4-butanediol, 1,6-hexanediol, 1,10-decanediol, glycerine, trimethylolpropane, and preferably ethylene glycol and diethylene glycol. Alkanolamines such as triethanolamine and triisopropanolamine can also be used as multifunctional alcohols.

Those polyester polyols are preferred which are produced by polycondensation of a dicarboxylic acid mixture which, based on the total weight of the named dicarboxylic acids, contains: 20 to 35 percent by weight, preferably 28 to 33 percent by weight, succinic acid; 35 to 50 percent by weight, preferably 40 to 45 percent by weight, glutaric acid; and 20 to 32 percent by weight, preferably 24 to 28 percent by weight, adipic acid; and alcohol mixtures from ethylene glycol/diethylene glycol, ethylene glycol/trimethylolpropane, diethylene glycol/trimethylolpropane, ethylene glycol/triisopropanolamine, and diethylene glycol/triisopropanolamine. In addition to the named dicarboxylic acids, the dicarboxylic acid mixture may contain up to 5 percent by weight, preferably approximately 2 to 3 percent by weight, relative to the total weight, of impurities, which consist primarily of imides of the succinic and glutaric acids.

Dicarboxylic acid mixtures of the indicated type may, for instance, be obtained as by-products during the manufacture of adipic acid by oxidation of cyclohexanol or cyclohexanone with nitric acid. According to the invention, the polyester polyols may be used as such or in the form of mixtures.

Particularly suitable polyester polyols include those derived from crude reaction residues and from scrap polyester resins. Those polyester polyol mixtures obtained from crude reaction residues include a number of sources. One such source comprises the polyester polyols derived from phthalic anhydride bottoms as disclosed in U.S. Pat. No. 4,521,611 cited supra whose disclosure relative thereto is incorporated herein by reference. A preferred source is best exemplified by the mixtures derived from the so-called DMT (dimethyl terephthalate) process residues by transesterification with low molecular weight aliphatic glycols. Typical DMT polyester polyols, for example, are disclosed in U.S. Pat. No. 3,647,759 which disclosure is incorporated herein by reference in its entirety and wherein the residue derived from DMT production via air oxidation of p-xylene is utilized. The oxidate residue contains a complex mixture of polycarbomethoxy substituted diphenyls, polyphenyls, and benzylesters of the toluate family. This residue is transesterified with an aliphatic diol such as ethylene glycol, propylene glycol, diethylene glycol, dipropylene glycol, and the like to produce a variety of low cost, predominately hydroxyl-functional polyester polyols with a wide variety of physical properties. Such DMT derived polyester polyols include those produced under the name TERATE ® 200 series resin polyols supplied by Hercules Inc.

Those polyester polyol mixtures obtained from scrap polyester resins are best exemplified by the mixtures obtained by digesting scrap polyethylene terephthalate (PET) with low molecular weight aliphatic glycols. Typical are the aromatic ester based polyols derived from digesting polyalkylene terephthalate with organic diols and triols having a molecular weight from 62 to 500 as disclosed in U.S. Pat. No. 4,048,104 which disclosure relative thereto is incorporated herein by reference; the aromatic polyester polyols obtained from the reaction of polyethylene terephthalate residue with alkylene oxides in the presence of a basic catalyst as disclosed in U.S. Pat. No. 4,439,549 already incorporated herein; the aromatic polyester polyols derived from recycled polyethylene terephthalate waste streams, alkylene glycols, and dibasic acid waste streams as disclosed in U.S. Pat. No. 4,439,550 and U.S. Pat. No. 4,444,918 which disclosures relative thereto are already incorporated herein; the aromatic polyester polycarbonate polyols derived from polyethylene terephthalate residues and alkylene carbonates as disclosed in U.S. Pat. No. 4,465,793 which disclosure relative thereto is incorporated herein by reference; the liquid terephthalic ester polyols derived from recycled or scrap polyethylene terephthalate and diethylene glycol and one or more oxyalkylene glycols as disclosed in U.S. Pat. No. 4,469,824 which disclosure relative thereto is already incorporated herein; the polyester polyols made by first reacting recycled polyethylene terephthalate scrap with an alkylene glycol followed by reaction with an alkylene oxide as disclosed in U.S. Pat. No. 4,485,196 which disclosure relative thereto is already incorporated herein; the copolyester polyols comprising the reaction products of an aromatic component selected from phthalic derivatives, polyethylene terephthalate, or dimethyl terephthalate with dibasic acid compounds, at least one primary hydroxyl glycol, and at least small amounts of a secondary hydroxyl glycol as taught in U.S. Pat. No. 4,559,370 which disclosure is incorporated herein by reference; and the like.

The polyisocyanate component used in accordance with the present invention can be any aromatic polyisocyanate known to be useful in the preparation of rigid polyurethane foams. Illustrative but non-limiting examples are m- and p-phenylene diisocyanate, methylenebis(phenyl isocyanate), polymethylene poly(phenyl isocyanates), 2,4-, 2,6-toluenediisocyanates and mixtures thereof, quasi prepolymers based on toluene diisocyanates (TDI), dianisidine diisocyanate, bitolylene diisocyanate, naphthalene-1,4-diisocyanate, and the like.

A preferred group of polyisocyanates comprise the polymethylene poly(phenyl isocyanates), particularly the mixtures containing from about 20 to about 85 percent by weight of methylenebis(phenyl isocyanate) with the remainder of the mixture comprising polymethylene poly(phenyl isocyanates) of functionality greater than 2; and mixtures of these polymethylene poly(phenyl isocyanates) with isocyanate terminated quasi prepolymers prepared from 2,4-, 2,6-toluenediisocyanates and mixtures thereof with less than 0.5 equivalency of at least one polyol component; an even more preferred TDI quasi prepolymer for use in combination with polymethylene poly(phenyl isocyanates) is one wherein the TDI reactant is a crude undistilled TDI containing a major proportion (70–90 percent) of pure toluene diisocyanate with the residue being phosgenation by-products of the toluene diamine. This crude TDI can be optionally, partially trimerized (about 10 to 25 percent by weight) prior to reaction with deficient polyol to form the quasi prepolymer; this is in accordance with the general procedure set forth in U.S. Pat. No. 3,652,424. The proportions of the two components are not critical but preferably the quasi prepolymer does not exceed about 60 percent by weight of the polyisocyanate mixture; preferably the mixture comprises 40 to 75 percent by weight of polymethylene poly(phenyl isocyanate) with the balance being the quasi prepolymer.

The proportions of polyisocyanate employed in reaction with the polyhydric combination are such that the NCO:OH ratio falls within a range of about 0.90 to about 1.15:1, preferably this range is from about 0.95:1 to about 1.10:1, most preferably 0.95:1 to 1.05:1.

Any catalyst known in the art for catalyzing urethane formation can be employed particularly organic amine and organometallic catalysts. Typical but non-limiting examples of organometallic catalysts are stannous octoate, dibutyl tin dilaurate, tin mercaptide, and the like. Typical but not limiting of amines are triethylenediamine, tetramethylethylenediamine, bis(2 -dimethylaminoethyl)ether, triethylamine, tripropylamine, tributylamine, triamylamine, pyridine, quinoline, dimethylpiperazine, piperazine, N,N-dimethylcyclohexylamine, N-ethylmorpholine, 2-methylpiperazine, N,N-dimethylethanolamine, tetramethylpropanediamine, methyltriethylenediamine, and the like, and mixtures thereof.

Generally speaking, the quantity of catalyst can fall within a range of from about 0.001 to about 5 percent by weight of the total polyurethane forming ingredients. Preferably, the catalyst is most effectively employed within a range of about 0.1 to about 2 percent by weight.

The bringing together of all of the above described ingredients under foam forming conditions calls for the use of at least one so-called foaming agent. Such an agent can be any one of the low boiling organic hydrocarbon and halogen substituted hydrocarbons known to be useful for this purpose. Illustrative of such blowing agents are dichlorodifluoromethane, dichlorofluoromethane, trichloromonofluoromethane, methylene chloride, 1,1-dichloro-1-fluoroethane, 1,1 -dichloro-2,2,2-trifluoroethane, 1-chloro-1,1-difluoro- 2,2-dichloroethane, 1,1-difluoroethane, $C_4 F_8$ cyclic Freon C-318, and mixtures thereof.

In addition to the above blowing agents, the present formulations also contemplate the presence of small proportions of water as additional blowing agents. Accordingly, water can be present in from zero to about 3 parts by weight per 100 parts of polyhydric combination.

The polyurethane foams produced can vary in density from about 0.5 pound per cubic foot to about 40 pounds per cubic foot, preferably from about 1.5 to about 6. However, in terms of the most practical densities for use in insulation applications wherein the uniquely low K factors can be realized to their full effect, the range is from about 1.75 to about 2.2 pounds per cubic foot. The density obtained is a factor of how much blowing agent is employed. The exact proportions of blowing agent required for a specific density will depend on the particular formulation being reacted according to such variables, amongst others, as the viscosity of the reaction mixture and the exotherm temperatures generated and the particular agent employed. Accordingly, the necessary proportions are readily determined by simple trial experiments. Illustratively, the blowing agent will fall within a range of from about 5 to about 25 percent, preferably 10 to 20 percent by weight of the total formulation weight.

Additional ingredients which may be employed under the foam forming conditions are dispersing agents, cell stabilizers, and surfactants. Surfactants, better known as silicone oils, are added to serve as cell stabilizers. Some representative materials are sold under the names of SF-1109, L-520, L-521, L-5420, L-5430 and DC-193 which are, generally, polysiloxane polyoxyalkylene block co-polymers, such as those disclosed in U.S. Pat. Nos. 2,834,748; 2,917,480; and 2,846,458, for example. When employed, the surfactant represents from about 0.05 to about 5, and, preferably 0.1 to 2 weight percent of the total ingredient weight.

Other optional additives for the foams of the invention can include from zero to 20, preferably from about 2 to about 15 parts of a flame retardant such as tris(2-chloroethyl)phosphate, tris(2-chloropropyl) phosphate, tris(2,3-dibromopropyl)phosphate, tris(1,3 -dichloropropyl)phosphate, diammonium phosphate, various halogenated aromatic compounds, antimony oxide, alumina trihydrate, polyvinyl chloride, and the like, and mixtures thereof. Other additives such as carbon black, colorants, and the like can be added. The addition of fillers such as barium sulfate may be used in such proportions that do not detract from the K factor of the foams.

As noted above, the present polyurethane foams can be provided in a wide range of densities. However, it is within the more generally accepted range for thermal insulation applications. i.e. 1.75 to 2.2 p.c.f. that the foams enjoy their maximum utility because of their surprisingly low K factors. It will be noted that it is the initial K factor which is reported herein. One skilled in this art fully recognizes that a cellular foam insulation value tends to decrease with time. Accordingly, the present foams are no exception. However, since they start at such a lower K value than prior art materials, their insulation value at the end of a measured time period still remains correspondingly lower.

In view of their extremely efficient thermal insulation, the present foams find particular utility in the insulation of tanks pipes, and the like where either high or low temperatures are to be maintained. Furthermore, the present foams are extremely useful in refrigerator and freezer cabinets, and the like.

The following examples describe the manner and process of making and using the invention and set forth the best mode contemplated by the inventors of carrying out the invention but are not to be construed as limiting.

EXAMPLE 1

The following experiment describes the preparation of five polyurethane foams (A through E) in accordance with the present invention and two polyurethane-polyisocyanurate foams not so in accordance (Comparisons 1 and 2).

The foams are prepared by mixing together the ingredients in the proportions of parts by weight set forth in Table I below. The general procedure involves first mixing the polyol B component ingredients in a 1 gallon plastic tub to be followed by the polyisocyanate A component ingredients. The combined ingredients are then rapidly mixed for 10 seconds using a high speed drill press motor (1720 r.p.m.) equipped with a 4 inch diameter Conn agitator. This mixture is immediately poured into a 14"×14"×14" cardboard box where the resulting foam is allowed to rise freely and the rise profile measurements in seconds recorded as set forth in Table I for each sample. All of the foams are formulated in an isocyanate:hydroxyl ratio of 1.05 except Comparison samples 1 and 2 which are classified as polyurethane-polyisocyanurate with the ratio of 1.75. Each foam is aged for at least three days at ambient (about 20° C.) room temperature prior to testing for density and the initial K value.

For the foams A through E the highest observed K factor is 0.100 while the lowest is 0.096. These values are to be compared with the polyisocyanurate comparison foams which are beginning to measurably exceed a value of 0.106.

TABLE I

| | | | Foams | | | | |
|---|---|---|---|---|---|---|---|
| | A | B | C | D | E | Comp. 1 | Comp. 2 |
| Ingredients (pts. by wt.) | | | | | | | |
| Component A | | | | | | | |
| Polyisocyanate I[1] | — | — | — | — | — | 1,000 | — |
| Polyisocyanate II[2] | 770 | — | 770 | — | — | — | 977 |
| Polyisocyanate III[3] | — | 828 | — | 828 | — | — | — |
| Polyisocyanate IV[4] | — | — | — | — | 805.5 | — | — |
| Monofluorotrichloromethane | 100 | 100 | 100 | 100 | 100 | 100 | 100 |
| Component B | | | | | | | |
| Terate ® 203[5] | 717 | 717 | — | — | — | 547 | 547 |
| Chardol ® 37-2513[6] | — | — | 695 | 695 | 695 | — | — |
| Cross-linking polyol I[7] | 161 | 161 | 161 | 161 | 161 | 122.6 | 123 |
| L-5420[8] | 17.6 | 17.6 | 17.1 | 17.1 | 17.1 | 13.4 | 13.4 |
| Polycat 8[9] | 7.9 | 7.9 | 7.7 | 7.7 | 7.7 | 1.34 | 1.34 |
| Trimer catalyst[10] | — | — | — | — | — | 13.4 | 13.4 |
| Monofluorotrichloromethane | 168 | 178 | 165 | 174 | 170 | 172 | 168 |
| NCO/OH | 1.05 | 1.05 | 1.05 | 1.05 | 1.05 | 1.75 | 1.75 |
| Properties | | | | | | | |
| Density p.c.f. | 1.98 | 1.91 | 2.11 | 1.91 | 1.91 | 1.83 | 1.66 |
| Initial K factor[11] btu-in/hr. ft² °F. | 0.100 | 0.097 | 0.096 | 0.100 | 0.098 | 0.108 | 0.116 |
| Rise Profile (all in seconds) | | | | | | | |
| Mix | 10 | 10 | 10 | 10 | 10 | 10 | 10 |
| Cream | 14 | 15 | 15 | 12 | 15 | 23 | 20 |
| Initiation | 17 | 17 | 16 | 15 | 17 | 26 | 26 |
| Gel | 45 | 40 | 43 | 45 | 42 | 58 | 57 |
| Rise | 60 | 60 | 53 | 60 | 60 | 74 | 70 |
| Tack Free | 65 | 50 | 50 | 55 | 55 | 80 | 90 |
| Firm | 155 | 150 | 240 | 180 | 180 | 210 | 100 |

Footnotes to Table I
[1]Polyisocyanate I: A polymethylene poly(phenyl isocyanate) mixture comprising about 41 percent by eight of methylenebis(phenyl isocyanate) with the balance of 59 percent being polymethylene poly(phenyl isocyanates) of functionality higher than 2; I.E. = about 134; viscosity = about 180 cps (at 25° C.).
[2]Polyisocyanate II: A polymethylene poly(phenyl isocyanate) mixture comprising about 65 percent by weight of methylenebis(phenyl isocyanate) with the balance of 35 percent being polymethylene poly(phenyl isocyanates) of functionality higher than 2; I.E. = about 131; viscosity = about 40 cps (at 25° C.).
[3]Polyisocyanate III: A polymethylene poly(phenyl isocyanate) mixture comprising about 23 percent by weight of methylenebis(phenyl isocyanate) with the balance of 77 percent being polymethylene poly(phenyl isocyanates) of functionality higher than 2; I.E. = about 141; viscosity = about 1800 cps (at 25° C.).
[4]Polyisocyanate IV: A polymethylene poly(phenyl isocyanate) mixture comprising about 29 percent by weight of methylenebis(phenyl isocyanate) with the balance of 71 percent being polymethylene poly(phenyl isocyanates) of functionality higher than 2; I.E. = about 138; viscosity = about 700 cps (at 25° C.).
[5]Terate ® 203: Transesterified crude DMT residue supplied by Hercules Chemical Co., Wilmington, Delaware; OH E.W. = 178; functionality about 2.3; viscosity = about 30,000 cps (25° C).
[6]Chardol ® 37-2513: A digestion product from scrap PET reacted with a mixture of glycols inclusive of diethylene glycol, triethylene glycol, and phthalic anhydride; OH E.W. = about 165; functionality about 2.3; viscosity = about 13,500 cps (25° C.).
[7]Cross-linking polyol I: Reaction product of a 0.3/1.0 molar mixture of sucrose and glycerine with 1.2 moles of propylene oxide per hydroxyl group: E.W. = about 115; average functionality = about 4.3.
[8]L-5420: A polydimethylsiloxane polyoxyalkylene block copolymer surfactant supplied by Union Carbide Corporation.
[9]Polycat 8: A tertiary amine urethane catalyst supplied by Air Products and Chemicals Inc.
[10]Trimer catalyst: Hexcem 977, a solution of about 75 percent by weight of potassium octoate and 25 percent diethylene glycol; supplied by Mooney Chemicals Inc.
[11]K Factor: Measure of heat transfer in BTU-inch/hour ft² °F., measured in accordance with ASTM Test Method C-518.

EXAMPLE 2

This experiment describes the preparation of fifteen polyurethane foams (F through T) in accordance with the present invention and three comparison foams (3 through 5) not so in accordance. The same procedure and apparatus set forth in Example 1 is used herein along with the various ingredients in the proportions of parts by weight set forth in Table II.

This series of foams of the invention differ principally from those of Example 1 by employing mixtures of the respective polymethylene poly(phenyl isocyanates) with either a 50/50 or 75/25 weight proportion of a toluene diisocyanate quasi prepolymer identified as TDI Quasi I and described in footnote 5 of Table II. This leads to polyurethane foams characterized by even lower K factors than those of Example 1. For example, foam R has a value of 0.093 and the majority of the foams are consistently below 0.100.

Comparison foam 3 shows the effect on K factor when one of the otherwise preferred formulations of the invention is used with excess isocyanate to make a polyurethane-polyisocyanurate foam. A direct comparison of Foam I with Comparison 3 shows the drop in K factor from 0.096 for the former to 0.116 for the latter.

Comparison foam 4 shows the effect of using a cross-linking polyol alone in the absence of the polyester polyol ingredient. Its K factor is 0.114.

TABLE II

| | | | | | Foams | | | | |
|---|---|---|---|---|---|---|---|---|---|
| | F | G | H | I | J | K | L | M | N |
| Ingredients (pts. by wt.) | | | | | | | | | |
| Component A | | | | | | | | | |
| Polyisocyanate I[1] | 377 | — | — | — | — | — | — | 377 | — |
| Polyisocyanate II[2] | — | 372 | — | — | 568.5 | — | — | — | 372 |
| Polyisocyanate III[3] | — | — | 387 | — | — | 600 | — | — | — |
| Polyisocyanate IV[4] | — | — | — | 381.5 | — | — | 588 | — | — |
| TDI Quasi I[5] | 377 | 372 | 387 | 381.5 | 189.5 | 200 | 196 | 377 | 372 |
| Monofluorotrichloromethane | 100 | 100 | 100 | 100 | 100 | 100 | 100 | 100 | 100 |
| Component B | | | | | | | | | |
| Terate ® 203 | 717 | 717 | 717 | 717 | 717 | 717 | 717 | — | — |
| Chardol ® 37-2513 | — | — | — | — | — | — | — | 695.1 | 695 |
| Cross-linking polyol I[6] | 161 | 161 | 161 | 161 | 161 | 161 | 161 | 161 | 161 |
| Cross-linking polyol II[7] | — | — | — | — | — | — | — | — | — |
| L-5420 | 17.6 | 17.6 | 17.6 | 17.6 | 17.6 | 17.6 | 17.6 | 17.12 | 17.12 |
| Polycat 8 | 6.15 | 6.15 | 5.3 | 7.9 | 6.15 | 7.95 | 7.9 | 5.1 | 7.7 |
| Trimer catalyst[8] | — | — | — | — | — | — | — | — | — |
| Monofluorotrichloromethane | 166 | 164 | 169 | 167 | 166 | 173 | 167 | 162 | 160 |
| NCO/OH | 1.05 | 1.05 | 1.05 | 1.05 | 1.05 | 1.05 | 1.05 | 1.05 | 1.05 |
| Properties | | | | | | | | | |
| Density p.c.f. | 1.91 | 2.05 | 1.93 | 2.04 | 1.94 | 1.85 | 1.99 | 2.02 | 2.08 |
| Initial K factor btu-in/hr. ft$^2$ °F. | 0.096 | 0.094 | 0.103 | 0.094 | 0.094 | 0.099 | 0.099 | 0.096 | 0.093 |
| Rise Profile (all in seconds) | | | | | | | | | |
| Mix | 10 | 10 | 10 | 10 | 10 | 10 | 10 | 10 | 10 |
| Cream | 15 | 15 | 25 | 14 | 17 | 15 | 14 | 12 | 10 |
| Initiation | 20 | 21 | 30 | 17 | 21 | 17 | 16 | 15 | 11 |
| Gel | 60 | 65 | 80 | 45 | 55 | 40 | 42 | 60 | 45 |
| Rise | 78 | 80 | 120 | 60 | 65 | 55 | 55 | 75 | 55 |
| Tack Free | 95 | 100 | 130 | 55 | 80 | 50 | 50 | 95 | 50 |
| Firm | 210 | 240 | 240 | 240 | 240 | 180 | 240 | 180 | 300 |

| | | | | Foams | | | | |
|---|---|---|---|---|---|---|---|---|
| | O | P | Q | R | S | T | Comp. 3 | Comp. 4 |
| Ingredients (pts. by wt.) | | | | | | | | |
| Component A | | | | | | | | |
| Polyisocyanate I[1] | — | — | 578 | — | — | — | 478 | 377 |
| Polyisocyanate II[2] | — | — | — | 568.5 | — | — | — | — |
| Polyisocyanate III[3] | 387 | — | — | — | 600 | — | — | — |
| Polyisocyanate IV[4] | — | 381.5 | — | — | — | 588 | — | — |
| TDI Quasi I[5] | 387 | 381.5 | 193 | 189.5 | 200 | 196 | 478 | 377 |
| Monofluorotrichloromethane | 100 | 100 | 100 | 100 | 100 | 100 | 100 | 100 |
| Component B | | | | | | | | |
| Terate ® 203 | — | — | — | — | — | — | 547 | — |
| Chardol ® 37-2513 | 695 | 695 | 695 | 695 | 695 | 695 | — | — |
| Cross-linking polyol I[6] | 161 | 161 | 161 | 161 | 161 | 161 | 123 | — |
| Cross-linking polyol II[7] | — | — | — | — | — | — | — | 753 |
| L-5420 | 17.12 | 17.12 | 17.12 | 17.12 | 17.12 | 17.12 | 13.4 | 15.1 |
| Polycat 8 | 4.3 | 7.7 | 6.15 | 7.7 | 7.7 | 7.7 | 1.34 | 11.3 |
| Trimer catalyst[8] | — | — | — | — | — | — | 6.7 | — |
| Monofluorotrichloromethane | 165 | 164 | 165 | 163 | 170 | 167 | 165 | 166 |

TABLE II-continued

| | | | | | | | | |
|---|---|---|---|---|---|---|---|---|
| NCO/OH | 1.05 | 1.05 | 1.05 | 1.05 | 1.05 | 1.05 | 1.75 | 1.05 |
| Properties | | | | | | | | |
| Density p.c.f. | 1.93 | 1.96 | 2.06 | 2.09 | 1.98 | 2.01 | 1.80 | 1.83 |
| Initial K factor btu-in/hr. ft² °F. | 0.103 | 0.094 | 0.099 | 0.096 | 0.101 | 0.096 | 0.116 | 0.114 |
| Rise Profile (all in seconds) | | | | | | | | |
| Mix | 10 | 10 | 10 | 10 | 10 | 10 | 10 | 10 |
| Cream | 22 | 9 | 18 | 10 | 8 | 12 | 25 | 10 |
| Initiation | 25 | 10 | 20 | 12 | 10 | 15 | 30 | 10 |
| Gel | 80 | 40 | 78 | 45 | 45 | 45 | 80 | 60 |
| Rise | 115 | 60 | 90 | 55 | 55 | 60 | 100 | 85 |
| Tack Free | 145 | 55 | 130 | 60 | 50 | 60 | 130 | 100 |
| Firm | 240 | 240 | 240 | 300 | 180 | 240 | 240 | 360 |

Footnotes to Table II
[1-4]Polyisocyanates I to IV: These are the same polyisocyanates described in Footnotes 1 to 4 of Table I.
[5]TDI Quasi I: A quasi prepolymer having an isocyanate eq. wt. = about 122.5 and functionality = about 2.15 and viscosity = about 600 cps (at 25° C.) obtained by reacting (1) about a 7 percent by weight proportion of a polyether polyol obtained by propoxylating a sucrose/glycerine mixture to a product of equivalent wt. = about 126, functionality = about 4.5, and viscosity = about 6,500 cps (at 25° C.); with (2) about 93 percent by weight of a partially trimerized crude toluene diisocyanate obtained by trimerizing a crude TDI mixture of about 85 to about 87 percent pure toluene diisocyanate and about 15 to about 13 percent of crude toluene diisocyanate phosgenation by-products to a trimer content of about 17 percent by weight: this quasi prepolymer is obtained essentially in accordance with the procedures set forth in U.S. Pat. No. 3,652,424.
[6]Cross-linking polyol I: described in footnote 7 of Table I.
[7]Cross-linking polyol II: Blend of (1) about 77 percent by weight of a propoxylated mixture of sucrose and an already propoxylated blend of sucrose/glycerine (described as cross-linking polyol I in Table I) to an eq. wt. = about 152 and functionality about 7; (2) about 13 percent by weight methyldiethanolamine; and (3) about 10 percent of a 2.000 molecular weight polypropylene glycol: blend eq. wt. = about 130; and average functionality = about 4.0.
[8]Trimer catalyst: described in footnote 10 of Table I.

EXAMPLE 3

This experiment describes the preparation of four polyurethane foams (Y, Z, Y-1, and Z-1) all in accordance with the present invention. The same procedure and apparatus set forth in the previous examples is employed herein along with the ingredients in the proportions of parts by weight set forth in Table III.

This series of foams differs principally from those of Example 2 in employing the Polyisocyanate I with a TDI Quasi II prepolymer differing from that employed in previous examples and described in footnote 2 below. The polyisocyanate mixtures are employed either in a 50/50 or 75/25 weight combination with the same polyester polyols and cross-linking polyol I previously employed in the above examples.

All of the foams are characterized by the low K factors characteristic of the present foams except for Y-1 which has a value of 0.114. This value is considered to be not representative because the actual foam sample is poor with large voids. Selection of a proper foam sample for K factor testing is not possible.

TABLE III

| | Foams | | | |
|---|---|---|---|---|
| | Y | Y-1* | Z | Z-1 |
| Ingredients (pts. by wt.) | | | | |
| Component A | | | | |
| Polyisocyanate I[1] | 377 | 578 | 377 | 578 |
| TDI Quasi II[2] | 377 | 193 | 377 | 193 |
| Monofluorotrichloromethane | 100 | 100 | 100 | 100 |
| Component B | | | | |
| Terate 203 | 717 | 717 | — | — |
| Chardol 37-2513 | — | — | 695 | 695 |
| Cross-linking polyol I[3] | 161 | 161 | 161 | 161 |
| L-5420 | 17.6 | 17.6 | 17.12 | 17.12 |
| Polycat 8 | 6.15 | 6.15 | 5.1 | 6.15 |
| Monofluorotrichloromethane | 166 | 168 | 1.62 | 165 |
| NCO/OH | 1.05 | 1.05 | 1.05 | 1.05 |
| Properties | | | | |
| Density, pcf | 1.98 | 2.04 | 2.15 | 1.89 |
| Initial K factor btu-in/hr. ft² °F. | 0.100 | 0.114 | 0.099 | 0.104 |
| Rise profile (all in seconds) | | | | |
| Mix | 10 | 10 | 10 | 10 |
| Cream | 20 | 25 | 17 | 15 |
| Initiation | 22 | 28 | 20 | 20 |
| Gel | 65 | 70 | 70 | 65 |
| Rise | 90 | 90 | 100 | 75 |
| Tack free | 120 | 130 | 155 | 125 |
| Firm | 240 | 190 | 240 | 180 |

*Large voids in the foam due to improper mixing thereby yielding poor foam samples and thus the high K factor value.

Footnotes to Table III
[1]Polyisocyanate I: described in footnote 1 of Table 1.
[2]TDI Quasi II: A quasi prepolymer having an isocyanate eq. wt. = about 122 and functionality = about 2.1 and viscosity = about 150 cps (at 25° C.) obtained by reacting a mixture comprising (1) about 93 percent by weight of crude undistilled toluene diisocyanate containing about 75 percent by weight of pure toluene diisocyanate and 25 percent crude toluene diisocyanate phosgenation by-products; (2) about 4 percent by weight of a propoxylated sucrose/glycerine: 64/36 by wt. mixture to functionality of about 4.5, eq. wt. = about 126; and (3) about 3 percent of dipropylene glycol.
[3]Cross-linking polyol I: described in footnote 7 of Table 1.

EXAMPLE 4

Polyurethane foam samples AA, BB and CC are prepared from the formulations set out in Table IV following. The general procedure described in Example 1 is used.

TABLE IV

| | Sample No. | | |
|---|---|---|---|
| Component | AA | BB | CC |
| Virgin Polyester polyol[1] | 25 | 25 | 50 |
| Cross-linking polyol I[2] | 75 | 75 | 0 |
| Cross-linking polyol III[3] | 0 | 0 | 50 |

TABLE IV-continued

| Component | Sample No. | | |
|---|---|---|---|
| | AA | BB | CC |
| B-8404 [4] | 2.0 | 2.0 | 0 |
| L-5440 [5] | 0 | 0 | 2.0 |
| R-8029 [6] | 0 | 0 | 0.75 |
| UL-6 [7] | 0.075 | 0.1 | 0.05 |
| PC-5 [8] | 5.0 | 2.0 | 0 |
| PC-8 [9] | 3.0 | 2.5 | 0 |
| CFC-11 | 47 | 47 | 42 |
| Polyisocyanate I [10] | 115 index | 105 index | 105 index |

[1] A 181.5 equivalent weight polyester polyol based on phthallic anhydride, sold as Stepanol PS 3152 by Stepan Chemical Company.
[2][10] See Table I.
[3] An aminoethylpiperazine-initiated poly(propylene oxide) having an equivalent weight of 122.5.
[4][5] A commercially available silicone surfactant.
[6][7] Organotin catalyst.
[8][9] A tertiary amine urethane catalyst supplied by Air Products and Chemicals, Inc.

Foam AA has a cream time of 3 seconds, a gel time of 13 seconds, a tack-free time of 17 seconds, a minimum fill density of 2.09 pcf, a non-shrink density of 2.40 pcf and a K factor of 0.098. Similar K factors are obtained when this experiment is repeated using the virgin polyester polyol and crosslinking polyol I at a 85:15 weight ratio. Foam BB has a cream time of 5 seconds, a gel time of 22 seconds, a tack-free time of 32 seconds, a minimum fill density of 2.15 pcf, a non-shrink density of 2.35 pcf and a K factor of 0.103. Foam CC has a cream time of 3 seconds, a gel time of 17 seconds, a tack-free time of 20 seconds, a minimum fill density of 1.84 pcf, a non-shrink density of 2.17 pcf and a K factor of 0.100.

What is claimed is:

1. In a rigid cellular polyurethane prepared by bringing together under foam forming conditions an aromatic polyisocyanate and a polyhydric combination comprising (a) a polyester polyol and (b) from about 5 to about 80 percent by weight based on the combined weight of (a) and (b) of a crosslinking aliphatic polyether polyol having a hydroxyl equivalent weight of from about 80 to about 180, wherein the polyurethane has an initial insulation K factor of consistently about 0.004 Btu-in/hr.ft$^2$°F. less than that of a foam prepared in the same manner, except that component (b) is replaced with an equivalent amount of a crosslinking polyol other than component (b).

2. A rigid cellular polyurethane according to claim 1 wherein said cross-linking polyol (b) has a functionality from about 3.5 to about 8 and equivalent weight from about 70 to about 230.

3. A rigid cellular polyurethane according to claim 1 wherein said cross-linking polyol (b) comprises from about 5 to about 60 percent by weight of said polyhydric combination of (a) plus (b).

4. A rigid cellular polyurethane according to claim 1 wherein said polyester polyol (a) has an average functionality from about 2 to about 4 and average molecular weight from about 250 to about 1,500.

5. A rigid cellular polyurethane according to claim 1 wherein said polyisocyanate is selected from the group consisting of polymethylene poly(phenyl isocyanates) and mixtures thereof with toluene diisocyanate quasi prepolymers.

6. A rigid cellular polyurethane according to claim 1 wherein the overall proportions of polyisocyanate to polyhydric combination are such that the NCO:OH ratio falls within a range of about 0.90 to 1.15:1.

* * * * *